(12) United States Patent
Ling et al.

(10) Patent No.: US 12,229,937 B2
(45) Date of Patent: *Feb. 18, 2025

(54) UNDERWATER CAMERA BIOMASS PREDICTION AGGREGATION

(71) Applicant: TidalX AI Inc., San Ramon, CA (US)

(72) Inventors: Julia Black Ling, Menlo Park, CA (US); Laura Valentine Chrobak, Menlo Park, CA (US)

(73) Assignee: TidalX AI Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,383

(22) Filed: Oct. 19, 2023

(65) Prior Publication Data
US 2024/0303799 A1    Sep. 12, 2024

Related U.S. Application Data

(63) Continuation of application No. 17/457,338, filed on Dec. 2, 2021, now Pat. No. 11,842,473.

(51) Int. Cl.
*G06T 7/00* (2017.01)
*A01K 61/95* (2017.01)
*G06N 3/08* (2023.01)

(52) U.S. Cl.
CPC ............ *G06T 7/0004* (2013.01); *A01K 61/95* (2017.01); *G06N 3/08* (2013.01)

(58) Field of Classification Search
CPC ......... G06T 7/0004; A01K 61/95; G06N 3/08

USPC ........................................................ 348/81
See application file for complete search history.

(56) References Cited

U.S. PATENT DOCUMENTS

| 10,856,520 | B1 | 12/2020 | Kozachenok et al. |
| 2017/0150701 | A1 | 6/2017 | Gilmore et al. |
| 2019/0228218 | A1 | 7/2019 | Barnaby et al. |
| 2019/0340440 | A1 | 11/2019 | Atwater et al. |
| 2020/0107524 | A1 | 4/2020 | Messana et al. |

(Continued)

FOREIGN PATENT DOCUMENTS

| CL | 2019000039 A1 | 3/2019 |
| CN | 108040948 | 5/2018 |

(Continued)

OTHER PUBLICATIONS

Extended Search Report in European Appln. No. 22151132.2, dated May 2, 2022, 10 pages.

(Continued)

*Primary Examiner* — James E Springer
(74) *Attorney, Agent, or Firm* — Fish & Richardson P.C.

(57) ABSTRACT

Methods, systems, and apparatus, including computer programs encoded on computer-storage media, for underwater camera biomass prediction aggregation. In some implementations, an exemplary method includes obtaining images of fish captured by an underwater camera; providing data of the images to a trained model; obtaining output of the trained model indicating the likelihoods that the biomass of fish are within multiple ranges; combining likelihoods of the output (Continued)

based on one or more ranges common to likelihoods of two or more fish to generate a biomass distribution; and determining an action based on the biomass distribution.

20 Claims, 6 Drawing Sheets

(56) References Cited

U.S. PATENT DOCUMENTS

| | | |
|---|---|---|
| 2020/0155882 A1 | 5/2020 | Tohidi et al. |
| 2020/0184206 A1 | 6/2020 | Barnaby |
| 2020/0288678 A1 | 9/2020 | Howe et al. |
| 2021/0289759 A1 | 9/2021 | Naval et al. |

FOREIGN PATENT DOCUMENTS

| | | |
|---|---|---|
| EP | 2244934 | 11/2010 |
| EP | 3484283 | 5/2019 |
| JP | 2002171853 | 6/2002 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2012/081990 | 6/2012 |
| WO | WO 2014/179482 | 11/2014 |
| WO | WO 2017/137896 | 8/2017 |
| WO | WO 2018/011744 | 1/2018 |
| WO | WO 2018/011745 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |
| WO | WO 2022/209435 | 10/2022 |
| WO | WO 2022/214650 | 10/2022 |
| WO | WO 2023/272371 | 1/2023 |
| WO | WO-2023163881 A1 * | 8/2023 ............. G06N 20/00 |

OTHER PUBLICATIONS

International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
International Search Report and Written Opinion in International Appln. No. PCT/US2022/043335, dated Dec. 19, 2022, 14 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon *Salmo salar*," Journal of Fish Biology, Nov. 2017, 91(6):1699-1712.
Wikipedia.com [online], "Mixture distribution," May 18, 2018, retrieved on Sep. 24, 2019, retrieved from URL<https://en.wikipedia.org/w/index.php?title=Mixture_distribution&ol.did=841868844/>, 7 pages.
International Search Report and Written Opinion in International Appln. No. PCT/US2022/043335, dated May 2, 2024, 8 pages.

* cited by examiner

UNDERWATER CAMERA BIOMASS PREDICTION AGGREGATION

CROSS-REFERENCE TO RELATED APPLICATIONS

This application claims the benefit of pending U.S. application Ser. No. 17/457,338, filed on Dec. 2, 2021, which is incorporated by reference herein in its entirety.

FIELD

This specification generally relates to camera controllers, particularly those that are used for underwater cameras.

BACKGROUND

A population of farmed fish may include fish of varying sizes, shapes, and health conditions. In the aquaculture context, prior to harvesting, a worker may remove some fish from the fish pen and weigh them. The manual process of removing the fish from the fish pen and weighing them is both time intensive and potentially harmful to the fish. In addition, because only a small portion of a fish population may be effectively measured in this way, the true characteristics of the population remain unknown.

SUMMARY

In general, innovative aspects of the subject matter described in this specification relate to obtaining images using underwater cameras and using the images to accurately measure the biomass of fish populations by generating biomass probability distributions for individual fish within the fish populations. Individual fish are photographed using an underwater camera. The images from the underwater camera are processed using computer vision and machine learning-based techniques to identify fish within the images and to determine features, e.g., truss lengths, on the fish. Biomass probability distributions for individual fish are generated by a model (e.g., neural network, Random Forest Regressor, Support Vector Regressor, or Gaussian Process Regressor, among others) that is trained to generate predicted biomass based, e.g., on truss lengths. The biomass of fish populations may be used to control the amount of feed given to a fish population, e.g., by controlling a feed distribution system, as well as to identify and isolate runt, diseased, or other sub-populations.

One innovative aspect of the subject matter described in this specification is embodied in a method that includes obtaining images of fish captured by an underwater camera including an image of a first fish and an image of a second fish; providing data corresponding to the images to a trained model; obtaining output of the trained model including one or more values indicating the likelihood that the first fish has a biomass within a first set of multiple ranges and one or more values indicating the likelihood that the second fish has a biomass within a second set of multiple ranges; combining the one or more values of the first fish and the one or more values of the second fish based on one or more ranges common to the first set and the second set to generate a biomass distribution; and determining an action based on the biomass distribution.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some implementations, actions include determining, based on the image of the first fish and the image of the second fish, a data set including a first value that indicates a length between a first point on the first fish and a second point on the first fish and a second value that indicates a length between a third point on the second fish and a fourth point on the second fish.

In some implementations, the data corresponding to the images includes the data set including the first value and the second value.

In some implementations, actions include detecting the first point and second point on the first fish and the third point and fourth point on the second fish.

In some implementations, detecting the points include providing the images to a second model trained to detect feature points on a fish body.

In some implementations, actions include detecting the first fish and the second fish within the images using a second trained model.

In some implementations, the action includes adjusting a feeding system providing feed to the fish.

In some implementations, the action includes sending data including the biomass distribution to a user device, where the data is configured to, when displayed on the user device, present a user of the user device with a visual representation of the biomass distribution.

In some implementations, the visual representation of the biomass distribution includes interactive elements configured to display one or more images of the fish.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
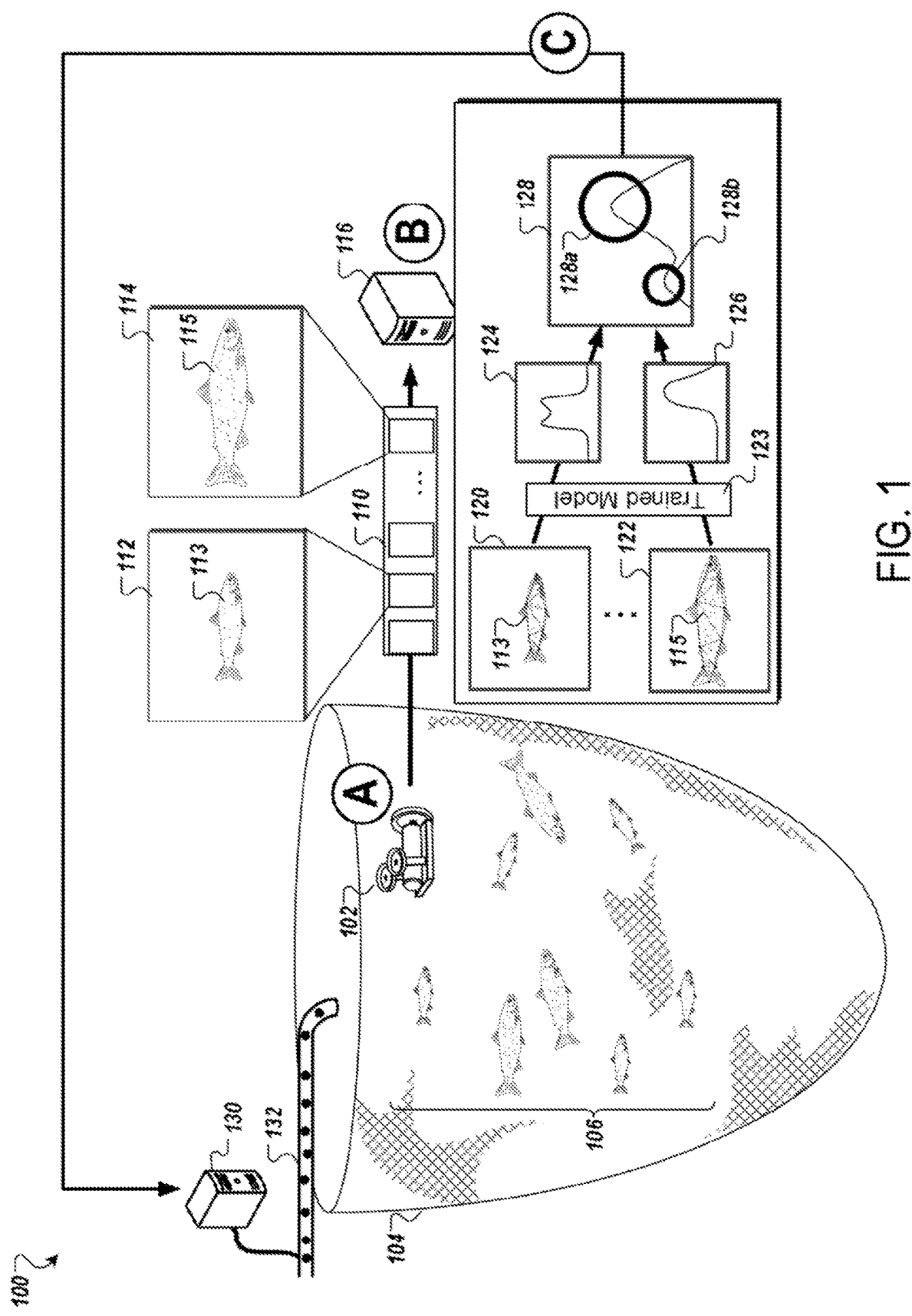
FIG. 1 is a diagram showing an example of a system that is used for underwater camera biomass prediction aggregation.

FIG. 1 is a diagram showing an example of a system 100 that is used for underwater camera biomass prediction aggregation. The system 100 includes a control unit 116 and an underwater camera device 102. Generally speaking, the control unit 116 obtains images captured by cameras of the camera device 102 and processes the images to generate biomass distribution predictions for one or more fish. The biomass distribution predictions for one or more fish can be aggregated and classified to determine actions such as feed adjustment, sorting, model training, and user report feedback, among others.

The system 100 also includes a feed controller unit 130 that controls the feed delivered by feed system 132. The feed controller unit 130 can include components configured to send control messages to actuators, blowers, conveyers, switches, or other components of the feed system 132. The control messages can be configured to stop, start, or change a meal provided to fish 106 in pen 104.

In this example, the camera device 102 includes propellers to move the camera device 102 around the fish pen 104. In general, the camera device 102 may use any method of movement including ropes and winches, waterjets, thrusters, tethers, buoyancy control apparatus, chains, among others.

In some implementations, the camera device 102 is equipped with the control unit 116 as an onboard component, while in other implementations, the control unit 116 is not affixed to the camera device 102 and is external to the camera device 102. For example, the camera device 102 may provide images 112 and 114 over a network to the control unit 116. Similarly, the control unit 116 can provide return data, including movement commands to the camera device 102 over the network.

Stages A through C of FIG. 1, depict two exemplary images, image 112 and image 114, obtained by the camera device 102 that are processed by the control unit 116. The images 112 and 114 include representations of the fish 113 and 115. Although images 112 and 114 show the fish 113 and 115 in profile view, images of fish obtained by the camera device 102 may include fish in any conceivable pose including head on, reverse head on, or skewed.

In stage A, the camera device 102 obtains the images 112 and 114 of the fish 113 and 115 within the pen 104. The camera device 102 provides the images 112 and 114, along with one or more additional images to the control unit 116 as obtained data 110.

Figure 2:
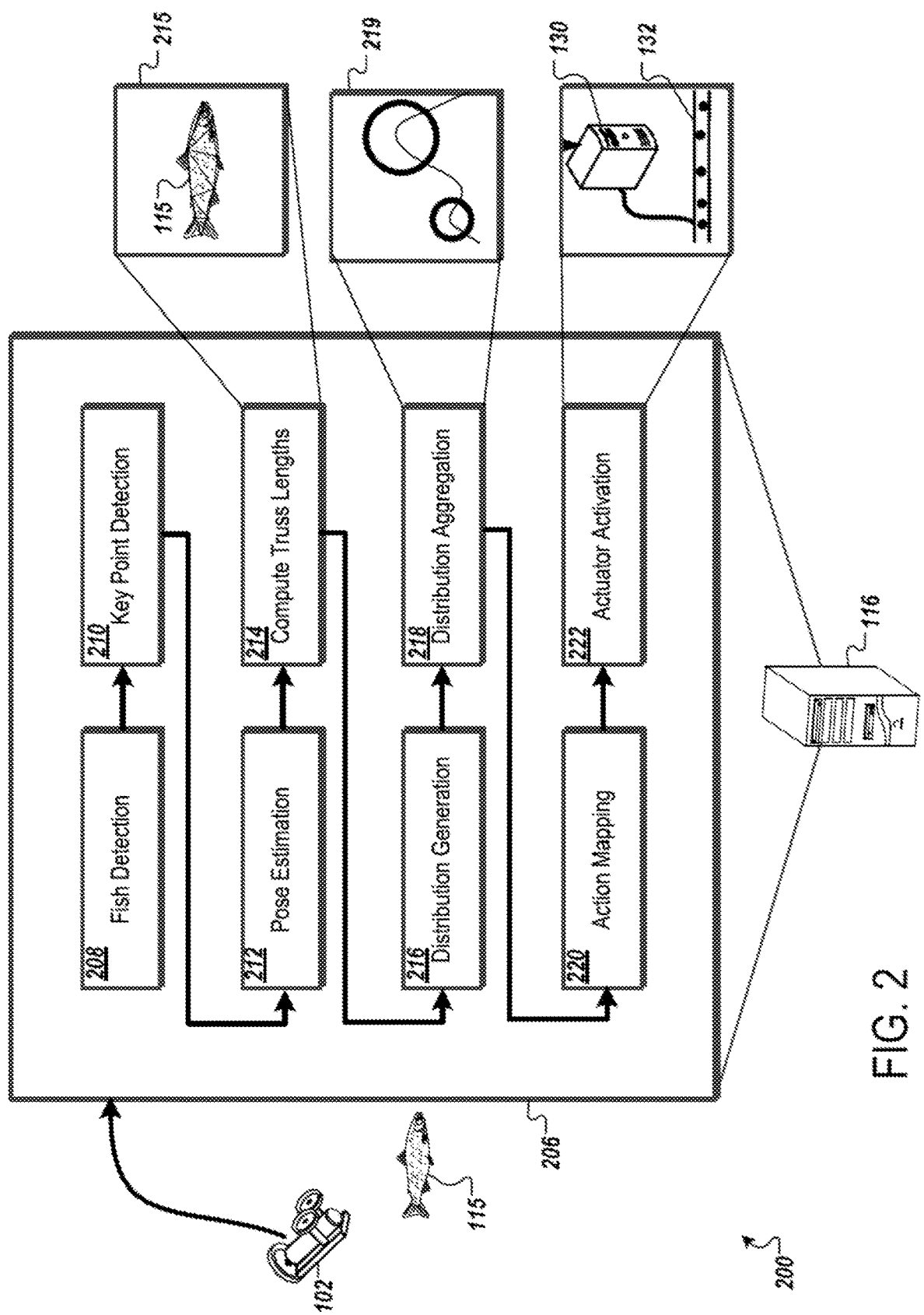
FIG. 2 is a flow diagram showing an example of a system for underwater camera biomass prediction aggregation.

In stage B, the control unit 116 processes the multiple images of the obtained data 110, including the images 112 and 114, as described in FIG. 2. The processed images include features, e.g., a truss network, for each fish detected in the images. The truss network for each fish detected in the multiple images of the obtained data 110 is provided to a trained model 123. The control unit 116 can operate the trained model 123 or can communicate with an external processor that operates the trained model 123.

The trained model 123 is trained using biomass data of fish. Truss networks of fish, including multiple lengths between detected key points of the fish. For example, a truss network for the fish 113 can include a distance between a detected mouth of the fish 113 and a dorsal fin of the fish 113. The control unit 116 provides the truss networks for the fish 113 and 115 to the trained model 123.

The control unit 116 obtains biomass distributions 124 and 126 corresponding to fish 113 and 115, respectively, from output of the trained model 123. The control unit 116 aggregates the biomass distributions 124 and 126 together with one or more additional biomass distributions generated from other obtained images of the obtained data 110. The control unit 116 generates aggregated biomass distribution 128 based on combining the multiple biomass distributions.

The control unit 116 generates, for each fish and across multiple weight ranges, the likelihood that the fish's weight is within that weight range. The collection of likelihoods for each weight range corresponding to a fish can be represented as a distribution as shown in biomass distributions 124 and 126. For example, weight ranges for the biomass distribution 124 may include ranges from 3 to 3.1 kilograms (kg), 3.1 to 3.2 kg, and 3.2 to 3.3 kg. A likelihood that the actual biomass of the fish 113 is within the first range, 3 to 3.1 kg, can be 10 percent. A likelihood that the biomass of the fish 113 is within the second or third range, 3.1 to 3.2 kg or 3.2 to 3.3 kg, respectively, can be 15 percent and 13 percent. In general, the sum of all likelihoods across all weight ranges can be normalized (e.g., equal to a value, such as 1, or percent such as 100 percent).

In some implementations, the weight ranges are indicated as values on an x axis of a distribution representation. For example, as shown in biomass distributions 124 and 126, a Gaussian, or Gaussian-like form can indicate a likelihood, shown on the y axis, for each weight range across a range of weight ranges, shown on the x axis.

The control unit 116 generates the aggregated biomass distribution 128 based on the likelihoods for each weight range indicated in the biomass distributions 124 and 126. In some implementations, the control unit 116 can combine likelihoods from different fish if the likelihoods correspond to the same weight range. For example, if both biomass distributions 124 and 126 include ranges from 3 to 3.1 kg, 3.1 to 3.2 kg, and 3.2 to 3.3 kg, the control unit 116 can sum the likelihood that the biomass of the fish 113 is within the weight range 3 to 3.1 kg, as indicated by the biomass distribution 124, with the likelihood that the biomass of the fish 115 is within the weight range 3 to 3.1 kg, as indicated by the biomass distribution 126. The aggregated biomass distribution 128 can indicate combined likelihoods for each weight range across all weight ranges for all detected fish.

In some implementations, the control unit 116 combines biomass distributions for all the fish 106 such that the aggregated biomass distribution 128 indicates the total number of fish 106. For example, each of the individual biomass distributions, including biomass distributions 124 and 126, can be normalized to equal a certain value, such as 1. In this case, after combining the individual biomass distributions by summing the individual likelihoods for each weight range across all weight ranges for each fish, the area under the curve of the aggregated biomass distribution 128 can be equal to the number of fish 106 multiplied by the normalized value used (e.g., 1 or 100).

In some implementations, the trained model 123 generates a specific biomass for each fish. For example, instead of providing a distribution, the trained model 123 can obtain the data 110, including images 112 and 114, and generate an indication of the most likely biomass based on the data. In some cases, truss length measurements can be used as input data for the trained model 123. In other cases, the trained model 123 can simply generate biomass indications based on obtained images.

In some implementations, the control unit 116 generates the aggregated biomass distribution 128 as a histogram. For example, the control unit 116 can obtain a specific biomass for each of the fish 106. By combining fish with biomasses in the same weight range, the control unit 116 can generate the aggregated biomass distribution 128 as a histogram of the specific biomasses. The histogram can indicate the number of fish that are within a weight range. In this case, each unit in the aggregated biomass distribution 128 would correspond to a fish whereas, when combining probability distributions, each unit would be the combination of multiple likelihoods corresponding to a given weight range.

In some implementations, the control unit 116 generates the aggregated biomass distribution 128 without weight ranges. For example, instead of weight ranges, the aggregated biomass distribution 128 can include specific weight values. In general, weight ranges can shrink to a single value where the trained model 123 generates a distribution of likelihoods for a range of specific biomass measurements and the control unit 116 can combine specific biomass measurements from multiple fish.

In some implementations, a representation of the aggregated biomass distribution 128 includes specific biomass measurements on an x axis. For example, a representation of the aggregated biomass distribution 128 can include weights (e.g., 1 kg, 2 kg, 3 kg) along a given axis, such as the x axis, instead of weight ranges. The likelihoods of biomasses, generated by the trained model 123, can be assigned to one or more of these specific weights.

In some implementations, the control unit 116 assigns likelihoods to weights in the aggregated biomass distribution 128. The likelihoods can be assigned based on proximity. For example, a likelihood that the fish 113 has a biomass of 1.4 kg is assigned to the weight that is closest to 1.4 kg, such as 1 kg, or 1.5 kg. Other likelihood values for other fish can be combined with the 1.4 kg likelihood if the other values are more close to the same weight than other weights.

In some implementations, the control unit 116 infers a weight range based on a predicted likelihood. For example, the trained model 123 can generate a prediction that the fish 113 is 1.4 kg. The control unit 116 can assign a 60% likelihood in a generated 1 kg bin and a 40% likelihood in a generated 2 kg bin.

In general, biomass predictions may be more accurate for one type of fish compared to another. For example, biomass predictions may be more accurate for smaller fish compared to larger fish or biomass predictions may be more accurate for larger fish compared to smaller fish. In some cases, this may be attributed to greater fluctuations in the growth of fish within a specific size range. In some cases, this may be attributed to larger training data sets for a particular type of fish (e.g., more small fish samples or large fish samples leading to more accurate predictions for that population). When inferring weight ranges, the control unit 116 can infer the distribution based on weight, such that a weight will be assigned to a broader range of weight bins based on a determination that the weight is associated with a population with greater variability in biomass or where biomass predictions are expected to be less accurate.

In stage C, the control unit 116 determines an action based on the aggregated biomass distribution 128. For example, as shown in FIG. 1, the control unit 116 detects subpopulations 128a and 128b. The subpopulations 128a and 128b correspond to runts and normal fish, respectively. After detecting the runt subpopulation 128b, the control unit 116 determines adjustment of the feed using the feed controller unit 130 controlling the feed system 132.

The control unit 116 can provide the aggregated biomass distribution 128 or a control signal to the feed controller unit 130. Depending on the data received from the control unit 116, the feed controller unit 130 can either process the aggregated biomass distribution 128 to determine an adjustment of feed and provide a control signal to the feed system 132 or can provide the control signal provided by the control unit 116 to the feed system 132.

In some implementations, the control unit 116 generates an aggregated biomass distribution that does not include multiple subpopulations. For example, the control unit 116 may generate an aggregated biomass distribution that does or does not satisfy a biomass requirement or threshold, such as a biomass requirement for distribution or sale. The control unit 116 can determine, based on features of the aggregated biomass distribution, what action to perform.

For example, if an aggregated biomass distribution does not satisfy a threshold (e.g., the mean or median biomass is too large or too small), the control unit 116 can provide a control signal to a sorting actuator of a sorting system to sort one or more fish from the fish 106 or can provide a control signal to adjust a feeding of the fish 106. For example, the control unit 116 can sort the fish 106 based on biomass. The control unit 116 can send a signal to sorting system that sorts fish based on one or more criteria, such as a threshold biomass, into multiple locations based on the one or more criteria.

In some implementations, the control unit 116 includes the feed controller unit 130. For example, the control unit 116 may control both the processing of the images in the obtained data 110 and the adjustments to the feeding by controlling the feed system 132.

In some implementations, the control unit 116 adjusts feeding to provide feed to a certain area of the fish pen 104. For example, the obtained data 110 can include positions of the fish detected within the images of the obtained data 110. The control unit 116 can determine based on the subpopulations 128a and 128b that the subpopulation 128b requires additional feed. The control unit 116 can send a control signal to the feed system 132 or to the control unit 130 for the feed system 132 configured to adjust the location of an output of feed. The control unit 116 can adjust the location of an output of feed to a location of one or more fish within the subpopulation 128b or an average location of the subpopulation 128b.

In some implementations, the feed system 132 includes multiple food types. For example, the controller unit 130 can provide control messages to the feed system 132 to change the food type provided to the fish 106. In some cases, the multiple food types include a medicated food type and a non-medicated food type. In some cases, the multiple food types include food with a particular nutritional value and food with a different nutritional value. The controller unit 130 can determine, based on an aggregated set of biomass distributions, which food to provide to the fish 106, how much food to provide, when to provide the food, and at what rate to provide the food. In general, the controller unit 130 can generate a meal plan based on the aggregated biomass distributions where the meal plan includes one or more of: a feed type, a feed rate, a feed time, and a feed amount.

FIG. 2 is a flow diagram showing an example of a system 200 underwater camera biomass prediction aggregation. The system 200 includes the underwater camera device 102 and the control unit 116 of the system 100 described in FIG. 1. The underwater camera device 102 obtains one or more images of the fish 115 and sends the one or more images to the control unit 116 as discussed in FIG. 1. The control unit 116 performs analysis based on the one or more images of the fish 115 and one or more images of other fish, such as the fish 113. The control unit 116 combines processed data with existing data. The existing data can be stored in a database accessible by the control unit 116.

In some implementations, the underwater camera device 102 is a stereo camera that captures one image from one angle of the fish 115 and another image from another angle of the fish 115. Stereo images can be sent to the control unit 116 as part of the one or more images obtained by the camera device 102. In FIG. 1, the obtained images are included in the obtained data 110. In some implementations, multiple imaging devices are used to obtain one or more images of the fish 115. The multiple imaging devices can be situated at different angles around the fish 115 and can capture different views of the fish 115.

A flow chart shown in item 206 illustrates a number of processing steps and actions performed by the control unit 116. The control unit 116 receives the one or more images of the fish 115 from the camera device 102 and performs fish detection 208. The fish detection 208 includes the use of a supervised neural network trained on labeled bounding boxes to detect fish using visual data. Boxes labeled as fish are used as a ground truth database to train the supervised neural network to detect objects sharing characteristics with the objects in the labeled bounding boxes, as fish. The supervised neural network, after being trained, is able to take one or more images from the camera device 102 and generate fish detections and bounding boxes around the fish within an image of one or more fish.

Figure 3:
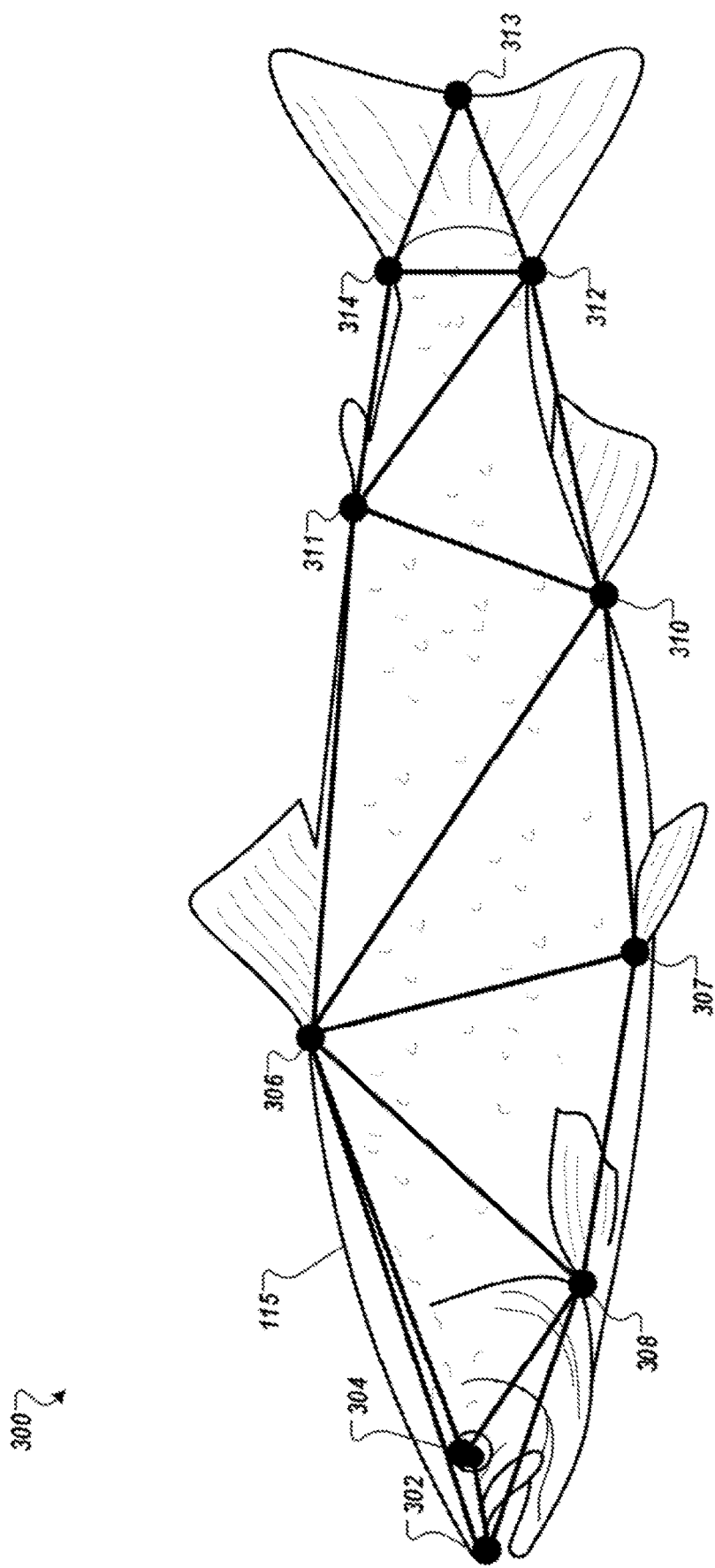
FIG. 3 is a diagram showing an example of a truss network.

In the one or more images processed by the fish detection 208, each fish present in the one or more images is a separate detection of a fish. In the example of FIG. 2, the fish 115 is detected within a section, or sections, of the one or more images obtained by the camera device 102. A process of key point detection 210 receives data from the fish detection 208 including visual information corresponding to the detection of the fish 115 in the one or more images. The one or more images include images from two angles known as stereo images. The key point detection 210 includes a supervised neural network trained using labeled key points on the images of the fish 115. Key points on the body of a fish are shown in FIG. 3 along with truss lengths connecting the key points.

In some implementations, the neural network used to detect the fish is separate from the neural network used to detect key points. For example, the two neural networks can be trained on separate data and a new version of one may be used with an older version of another allowing separate updates to the control unit 116. In other implementations, the detections take place in a single neural network trained to detect fish and key points associated with the fish. For example, a neural network trained using images of labeled fish and key points of the labeled fish can perform the operations of both the fish detection 208 and the key point detection 210. Other consolidations are possible in the control unit 116 process flow. For example, pose estimation may be included in the neural network detecting fish and key points.

Key points on a fish include body parts such as eyes, upper lip, and dorsal fin among others. Specific key points can vary for different species of fish or different animals. Training data containing sections of images labeled as specific key points are used to train the neural network. The trained neural network is used to label unlabeled data as including one or more key points. The unlabeled data is a section of an image including a detection of the fish 115. The key points are determined based on the section of the one or more images containing a detection of the fish 202.

A process of pose estimation 212 receives the detected key points from the key point detection 210. The pose estimation 212 receives key point detections from images including images captured from multiple angles or viewpoints of the fish 115. The multiple viewpoints, and corresponding key points detected in images from the multiple viewpoints, enable the pose estimation 212 to estimate a pose in three dimensions (3D). In some cases, key points identified in an image from one viewpoint and an image from another viewpoint are matched and projected into 3D space. The projections of the key points can then be used to estimate the pose of a fish, such as the fish 115 in 3D.

A process of computing truss lengths 214 receives information related to the 3D pose estimation and the key points detected on the body of the detected fish. The result of the computed truss lengths is shown in item 215. The fish 115 is shown with truss lengths along its body. A more detailed image of the fish 115 shown in item 215 is discussed in reference to FIG. 3. The truss lengths represent lengths between key points detected on the fish 115.

The pose estimation 212 is used to interpret distances between key points and thus determine truss lengths. For example, if the fish 115 is at a 15 degree angle from an imaginary line extending from the camera device 102, key points may appear close and thus truss lengths may appear to be of a small value compared to their true value. By using pose estimation 212, the 3D pose of the fish, including angle, is accounted for and accurate measurements of the fish 115 are made.

A process of distribution generation 216 receives information related to one or more of the previous processing steps including fish detections, detected key points of the detected fish, pose estimations of the detected fish, or computed truss lengths. The distribution generation 216 generates a biomass distribution based on the output of a trained model, such as the trained model 123.

In some implementations, the distribution generation 216 generates a biomass distribution based on obtained images. For example, instead of performing the process of computing truss lengths 214, the control unit 116 can generate biomass distributions based on images obtained by the camera device 102. The control unit 116 can include one or more models trained to generate biomass predictions. The one or more models can be trained based on images of fish and known biomasses for each of the fish within the images of fish. The one or more models can generate biomass predictions for each fish within the images of fish and compare the biomass predictions to the known biomasses. Based on comparing the biomass predictions to the known biomasses, the control unit 116 can adjust weights and or parameters within one or more layers of the one or more models to improve the performance of the one or more models to generate biomass predictions that are more equivalent to the known biomasses.

In some implementations, the distribution generation 216 includes a trained model. For example, as shown in FIG. 1, the control unit 116 generates a truss network for the fish 115 and provides the truss network to the trained model 123. The control unit 116 obtains output from the trained model 123 indicating a biomass distribution of the fish 115 based on the provided truss network.

In some implementations, the trained model 123 is trained to generate biomass probability distributions based on images or provided truss networks computed from images. The trained model 123 can output a Gaussian-type distribution with a mean and a standard deviation fully prescribing it, or any other non-Gaussian or multi-Gaussian probability distribution. The trained model 123 can generate biomass distributions for thousands of fish based on thousands of images captured by one or more underwater camera device.

The trained model 123 can be trained using ground truth data that includes truss networks or images of fish corresponding to known biomass measurements. The trained model 123 can go through a training process where a pre-trained model is adjusted such that the output of the model more closely matches the ground truth biomass distribution when provided truss networks or images of fish.

The distribution generation 216 generates biomass distribution for one or more fish based on images captured by the camera device 102. In some implementations, the control unit 116 sends biomass distribution data to a database for storage. For example, the distribution generation 216 of the control unit 116 can obtain images of fish, truss networks, or other related data and generate a biomass distribution. The generated biomass distribution can be sent by the control unit 116 to a database for storage. Each new biomass distribution generation can be stored in this way. When aggregating, the control unit 116 can access the stored biomass distribution data stored within the database or multiple separate databases.

Each of the biomass distributions generated by the distribution generation 216 can include a range of biomasses each with a different probability. In general, larger fish may have wider probability ranges than smaller fish. In some cases, fish sizes or shapes that are more common in a training data set of the trained model of the distribution generation 216 can be used to generate more accurate biomass distributions.

In some implementations, the distribution generation 216 includes a linear or polynomial regression model. For example, the distribution generation 216 can include a linear regression model trained using truss length measurements and corresponding ground truth weight. In some implementations, other algorithms, or processes performed on a computing device can be used to determine biomass based on the information of the fish 115. In this way, the distribution generation 216 determines a weight of the fish 115 or any other fish detected within the one or more images obtained by the camera device 102 and processed by the control unit 116.

In some implementations, the distribution generation 216 sends information to a database that tracks information corresponding to members of a population. In this case, the detection of the fish 115 can be added to an existing entry corresponding to the identity of the fish 115 or a new entry can be created to hold information related to the fish 115 and the detection. The data, including the computed weight, length, and at least one image of the one or more images, can be added to the database.

A process of distribution aggregation 218 combines previously generated biomass distributions. For example, the distribution aggregation 218 can use biomass distribution data within a database. The distribution aggregation 218 can combine multiple distributions for different fish and generate an aggregated biomass distribution that indicates a fraction of a population that may be defined as a "runt", the mean biomass for a group of fish aggregated, a fraction of population that either satisfies or does not satisfy a threshold biomass, as well as growth over time which may be correlated with feed conversation ratio (FCR).

Figure 4:
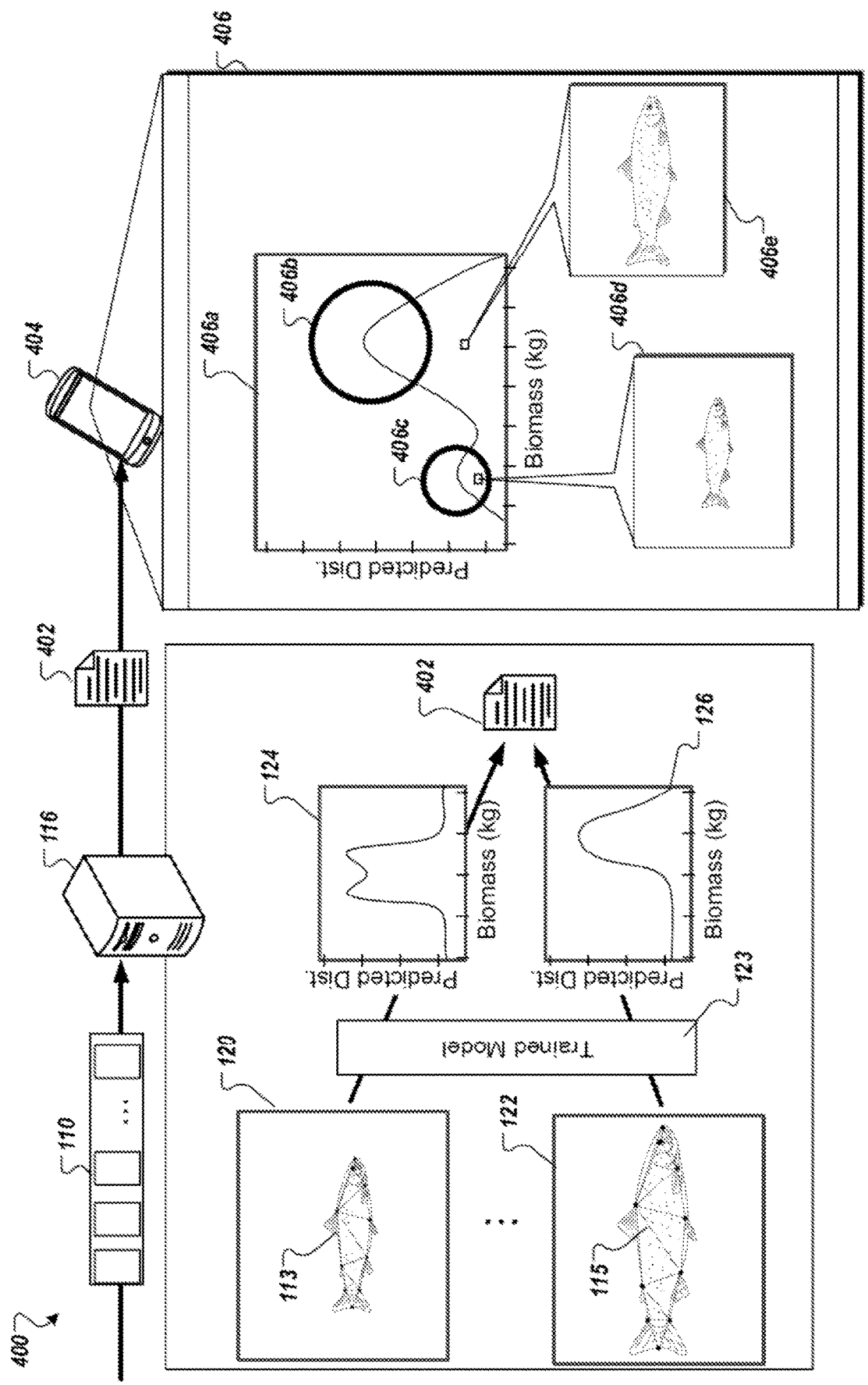
FIG. 4 is an example of a system for providing a user interface for interacting with a biomass prediction aggregation.

An aggregated biomass distribution 219 similar to the aggregated biomass distribution 128 of FIG. 1, shows two peaks indicating two subpopulations within the fish 106. A more detailed version of the aggregated biomass distribution 128 and the aggregated distribution 219 is shown in FIG. 4. The aggregated distribution 219 can include a probability of a percentage of a population having a certain biomass.

The aggregated biomass distribution 219 is sent to action mapping 220. The action mapping 220 uses predetermined criteria to determine, based on the aggregated biomass distribution 219, what action to take. Actions may vary depending on implementation but may include adjustments to feeding, sorting the fish, providing an alert, analysis, or report to a user, preparing downstream processes for harvesting or distributing a certain amount of fish.

In some implementations, the control unit 116 provides a control signal to a feeding system. For example, the control unit 116 can determine as a step within the action mapping 220, that the aggregated biomass distribution 219 includes two subpopulations. In order to increase the biomass of the smaller subpopulation, the control unit 116 can adjust the feeding to provide feed and a particular region where the smaller subpopulation is usually found. The location of the smaller subpopulation may be determined as an average of locations recorded for images of fish belonging to the smaller subpopulation.

For another example, the control unit 116 can determine that the aggregated biomass distribution is below a biomass threshold. The control unit 116 can send a signal to the feeding system to increase a feed rate or adjust the type of feed provided to the fish, such as changing the type of feed to a more calorie-rich diet.

In some implementations, the control unit 116 provides data to a downstream process based on the aggregated biomass distribution 219. For example, the control unit 116 can determine a probable total weight of a population of fish ready for harvest. The control unit 116 can provide data to a harvesting system that processes fish differently based on weight. In some cases, different machinery may be used for transportation or processing of fish. The control unit 116 can provide a control signal to the harvesting system configured such that the harvesting system uses machinery specific to the probable total weight of the population of fish.

In some implementations, the control unit 116, based on the action mapping 220, determines to sort the fish 115. For example, based on the physical characteristics and the distribution of fish as shown in the aggregated biomass distribution 219, the control unit 116 can generate a control signal for sorting the smaller fish from the larger fish.

Based on the action mapping 220, the control unit 116 can perform a process of actuator activation 222. In the example of FIG. 1, the control unit 116 generates and sends a control signal to the feed controller unit 130 to adjust the feed system 132. As discussed, herein many other actions may be performed based on the generation and analysis of the aggregated biomass distribution 219, such as sorting and report generation.

FIG. 3 is a diagram showing an example of a truss network 300. FIG. 3 shows truss lengths and key points computed for the fish 115 by the system 100 shown in FIG. 1 and the system 200 shown in FIG. 2. The truss lengths between key points are used to extract information about the fish including a weight of the fish. Various trusses, or lengths between key points, of the fish can be used. FIG. 3 shows a number of possible truss lengths including upper lip 302 to eye 304, upper lip 302 to leading edge dorsal fin 306, upper lip 302 to leading edge pectoral fin 308, leading edge dorsal fin 306 to leading edge anal fin 310, leading edge anal fin 310 to trailing low caudal peduncle 312, trailing lower caudal peduncle 312 to trailing upper caudal peduncle 314. Other key points and other separations, including permutations of key points mentioned, can be used. For different fish, or different species of fish, different key points may be generated. For any set of key points, a truss network may be generated as a model.

Other truss lengths not shown can be used by the system 100 and the system 200. For example, a truss length from the upper lip 302 to the tail 313 can be used as the length of the fish 115 and included in a collection of one or more truss length measurements and provided to the trained model 123 to generate a biomass distribution. In addition, specific truss lengths can be used to recognized specific deformities. Deformities such as shortened operculum can be detected using truss lengths such as a truss length from the upper lip 302 to the gill. Processing one or more images of a fish can include determining any of the following health conditions: shortened abdomen, shortened tail, scoliosis, lordosis, kyphosis, deformed upper jaw, deformed lower jaw, shortened operculum, runting or cardiomyopathy syndrome (CMS).

In some implementations, an aggregated biomass distribution includes health data related to one or more fish represented in the distribution. For example, the aggregated biomass distribution 128 includes health probabilities as well as, or instead of, biomass distributions. The health probabilities can be used to determine various remedial actions including providing medicated feed or moving the fish to a system for treatment, such as delousing.

FIG. 4 is an example of a system 400 for providing a user interface for interacting with a system for biomass prediction aggregation. As described in FIG. 1 and FIG. 2, the obtained data 110 is received by the control unit 116. The obtained data 110 includes the images 112 and 114. The images of the obtained data 110 are processed by the control unit 116 to generate truss networks for each detected fish in each obtained image as discussed in FIG. 2.

The truss networks of the images in the obtained data 110 are provided by the control unit 116 to the trained model 123 which generates biomass distributions. The biomass distributions 124 and 126 corresponding to the fish 113 and the fish 115, respectively, are shown in greater detail in FIG. 4. The biomass distributions 124 and 126 can include a range of biomass measured in kilograms or other suitable weight metrics. The predicted distribution indicated on the y axis indicates the probability of the fish 113 and 115 having a particular biomass.

For example, the fish 115 is predicted to have a larger biomass than the fish 113. However, the probability distribution of the fish 113 includes the possibility that the fish 113 actually has a larger biomass than the fish 115. However, this is less likely. By including a distribution corresponding to a probability of a predicted biomass, the control unit 116 can more accurately determine the biomass of a group of fish.

For example, the probability distribution 124 corresponding to the fish 113 includes two peaks. The peaks represent higher relative accuracy of the biomass of the fish 113. Without distribution aggregation, only one of the two peaks would likely be used to determine a total biomass of a population. That is, if the peaks are centered on weights x kilograms (kg) and y kg, without biomass distribution the fish 113 might either be classified as having a biomass of x or a biomass of y. However, any one single measurement prediction would not take into account the likelihood of other biomasses.

In a system that uses only single biomass measurements, if the single biomass measurement turns out to be incorrect, the total biomass for the population would likely be incorrect. In a system, like the system 400, 200, and 100 that uses biomass probability distribution for each member based on measured components of a member of the measured population, the total biomass for the population will likely indicate a range which includes the actual biomass of the population. Because prediction methods may not be exact, accounting for probability distribution in population measurements allow users and connected systems to more accurately determine the characteristics of the population within the accuracies afforded by prediction methods such as trained machine learning models or neural networks (e.g., the trained model 123).

The individual biomass distributions 124 and 126 are combined, together with one or more other biomass distributions corresponding to other fish represented in other images of the obtained data 110, to obtain aggregated data 402. The aggregated data 402 can include the aggregated biomass distribution 128 described in FIG. 1.

The control unit 116 provides the aggregated data 402 to a user device 404. The aggregated data 402 is configured to, when displayed on the user device 404, present a user of the user device 404 with a visual representation 406 of an aggregated biomass distribution 406a, notable features of the aggregated biomass distribution 406b and 406c, as well as interactive elements 406d and 406e.

The interactive elements 406d and 406e can be activated when a user selects a region within the aggregated distribution shown in the aggregated biomass distribution 406a. The interactive elements 406d and 406e can show information corresponding to members of the aggregated population such as the fish 113 and the fish 115. The interactive elements 406d and 406e can include other information such as a fish identification (ID) uniquely identifying the fish, an individual distribution corresponding to one or more fish that were combined to generate that region of the aggregated biomass distribution 406a, real-life images obtained by a camera device, such as the camera device 102, among others.

Figure 5:
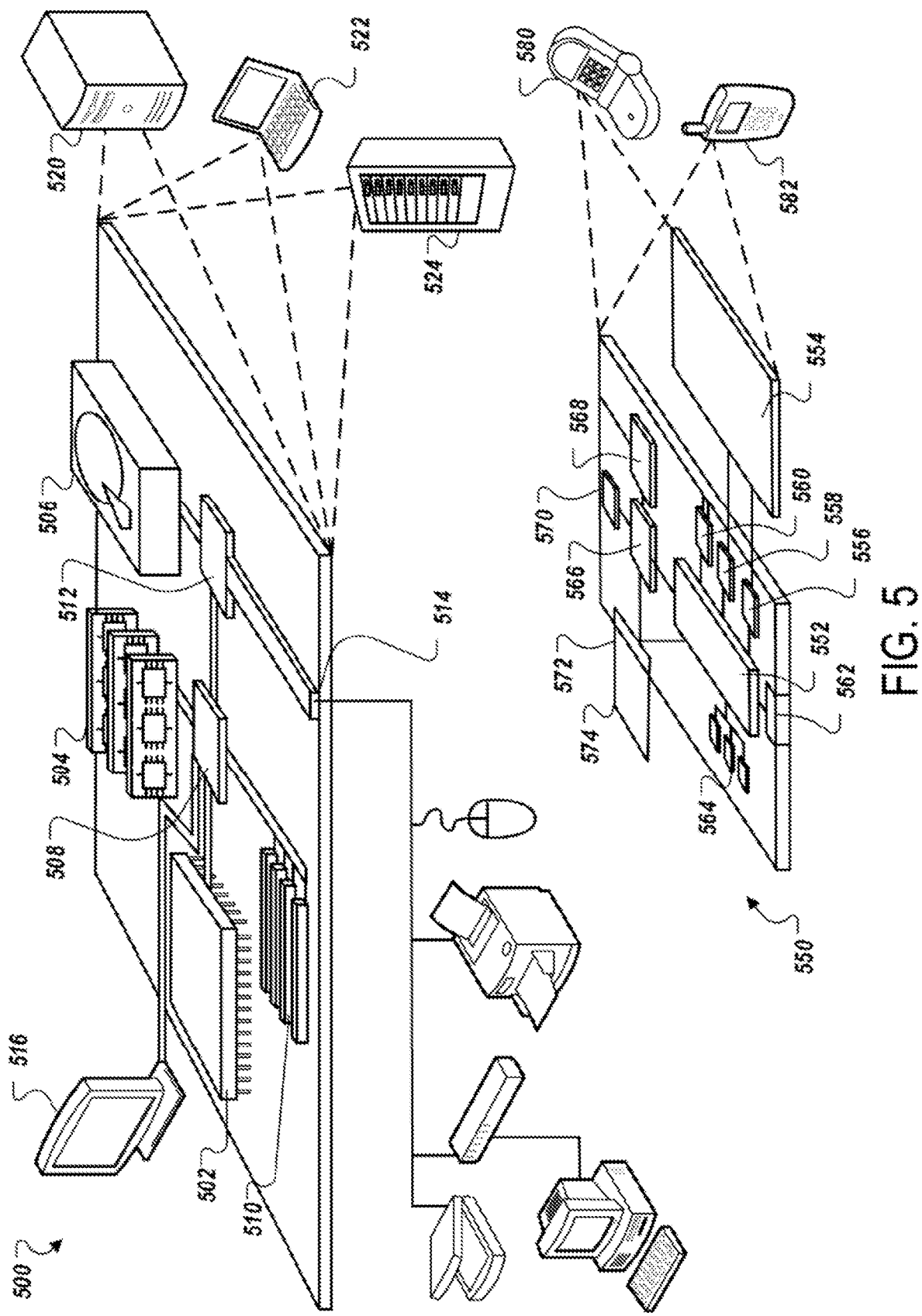
FIG. 5 is a diagram illustrating an example of a computing system used for underwater camera biomass prediction aggregation.

FIG. 5 is a diagram illustrating an example of a computing system used for biomass prediction aggregation. The computing system includes computing device 500 and a mobile computing device 550 that can be used to implement the techniques described herein. For example, one or more components of the system 100 could be an example of the computing device 500 or the mobile computing device 550, such as a computer system implementing the control unit 116, devices that access information from the control unit 116, or a server that accesses or stores information regarding the operations performed by the control unit 116.

The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 502 is a single threaded processor. In some implementations, the processor 502 is a multi-threaded processor. In some implementations, the processor 502 is a quantum computer.

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine readable mediums (for example, the memory 504, the storage device 506, or memory on the processor 502). The high-speed interface 508 manages bandwidth-intensive operations for the computing device 500, while the low-speed interface 512 manages lower bandwidth-intensive operations. Such allocation of functions is an example only. In some implementations, the high speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may include one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry in some cases. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 568 using a radio frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, among others) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Figure 6:
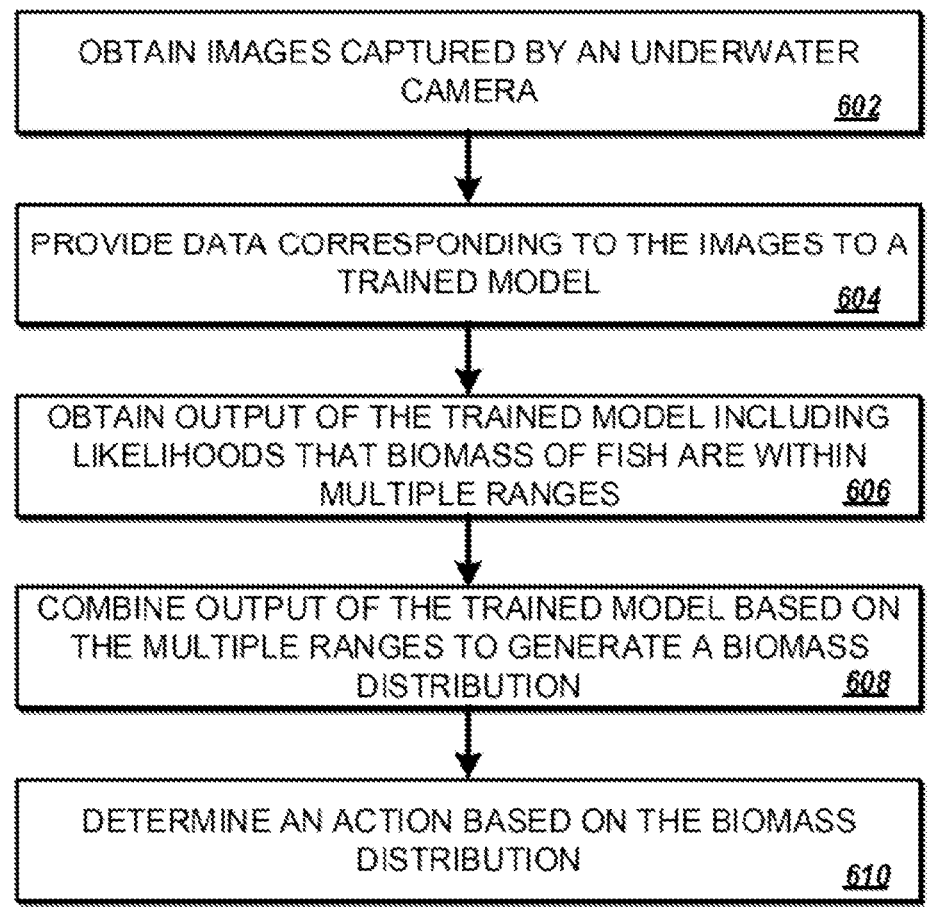
FIG. 6 is a flow diagram illustrating an example of a process for underwater camera biomass prediction aggregation.

FIG. 6 is a flow diagram illustrating an example of a process 600 for underwater camera biomass prediction aggregation. The process 600 can be performed by one or more electronic systems, for example, the system 100 shown in FIG. 1, the system 200 shown in FIG. 2, or the system 400 shown in FIG. 4.

The process 600 includes obtaining images captured by an underwater camera. For example, as shown in FIG. 1, the camera device 102 captures images of the fish 106 and provides them to the control unit 116. The control unit 116 obtains the images. In the example of FIG. 1, the control unit 116 obtains images 112 and 114 in the obtained data 110.

The process 600 includes providing data corresponding to the images to a trained model. For example, the control unit 116 can generate representations of the images 112 and 114 as the representations 120 and 122. In some cases, the representations 120 and 122 include the images 112 and 114. In some cases, the representations 120 and 122 include truss lengths generated based on fish detected in the images 112 and 114. The representations 120 and 122 are provided to the trained model 123.

The process 600 includes obtaining output of the trained model including likelihoods that biomass of fish are within multiple ranges. For example, the trained model 123, operating on the control unit 116 or on a processor communicably connected to the control unit 116, generates biomass distributions 124 and 126. The trained model generates, for each fish and across multiple weight ranges, the likelihood that the fish's weight is within that weight range. The collection of likelihoods for each weight range corresponding to a fish can be represented as a distribution as shown in biomass distributions 124 and 126.

The process 600 includes combining output of the trained model based on the multiple ranges to generate a biomass distribution. For example, the control unit 116 generates the aggregated biomass distribution 128 based on the likelihoods for each weight range indicated in the biomass distributions 124 and 126. The control unit 116 can combine likelihoods from different fish, such as the fish 113 and the fish 115, if the likelihoods correspond to the same weight range.

The process 600 includes determining an action based on the biomass distribution. For example, after detecting the runt subpopulation 128b in the aggregated biomass distribution 128, the control unit 116 determines adjustment of the feed using the feed controller unit 130 controlling the feed system 132.

In some implementations, other actions are performed. For example, the control unit 116 can determine, based on the aggregated biomass distribution 128, a future biomass distribution. In some cases, the control unit 116 can provide the aggregated biomass distribution 128 to a model trained to project biomass into the future. The control unit 116 can provide additional aggregated biomass distributions from earlier in time or from other populations to train the model to predict a likely biomass distribution in the future. The control unit 116 can determine actions to perform based on a future biomass predicted by the trained model.

In some implementations, the control unit 116 generates a future biomass prediction. For example, as discussed herein, the control unit 116 can provide the aggregated biomass distribution 128 to a model trained with historical data of the population or data from other populations to determine a likely future biomass distribution for the fish 106. The future biomass distribution prediction can be based on similar populations' growth over time based on similar current features, types of fish, time of year, feeding schedule, among others. If the future biomass distribution prediction includes features indicating runts, less than a threshold biomass, more than a threshold biomass, or other features, the control unit 116 can determine actions to perform.

In some implementations, the control unit 116 sends a signal to the feed system 132 based on a future biomass prediction. For example, the control unit 116 can determine that a current biomass distribution is indicative of a future biomass distribution issue (e.g., runt population). The control unit 116 can determine that the current biomass distribution is indicative of a future biomass distribution issue based on providing the current biomass distribution to a trained model as described herein. The control unit 116 can provide controls to one or more other systems or actuators based on the predicted future biomass to mitigate the issue in a future biomass distribution prediction. The control unit 116 can perform operations and re-predict the future biomass at a later time, or re-predict with changed parameters indicating the action performed or to-be-performed, to determine if intervening actions have improved or worsened the issue in the future biomass distribution prediction.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A computer-implemented method comprising:
obtaining images of multiple fish that were generated by an underwater camera;
for each of two or more of the multiple fish, generating a set of features corresponding to the fish using the obtained images;
for each of the two or more of the multiple fish, providing the set of features corresponding to the fish to a model that is trained, based on a given input set of features for a given fish, to output a distribution indicating likelihoods of a biomass of the given fish being within multiple biomass ranges;
for each of the two or more of the multiple fish, receiving a distribution indicating the likelihoods of the biomass of the fish being with the multiple biomass ranges;
aggregating the distributions of the two or more of the multiple fish; and
performing an action based on the aggregated distributions of the two or more of the multiple fish.

2. The method of claim 1, wherein performing the action comprises transmitting a control message to an actuator, blower, or conveyer of a feed system.

3. The method of claim 1, wherein the set of features comprises data indicating lengths between key points of each fish.

4. The method of claim 1, wherein aggregating the distributions comprises summing the likelihoods for each of the multiple biomass ranges.

5. The method of claim 1, wherein performing the action comprises identifying subpopulations of fish within the aggregated distributions.

6. The method of claim 1, wherein performing the action comprises changing a location of an ongoing fish feeding session.

7. The method of claim 1, wherein generating the set of features comprise performing a 3D pose estimation for each of the multiple fish.

8. A non-transitory, computer-readable medium storing one or more instructions executable by a computer system to perform operations comprising:
obtaining images of multiple fish that were generated by an underwater camera;
for each of two or more of the multiple fish, generating a set of features corresponding to the fish using the obtained images;
for each of the two or more of the multiple fish, providing the set of features corresponding to the fish to a model that is trained, based on a given input set of features for a given fish, to output a distribution indicating likelihoods of a biomass of the given fish being within multiple biomass ranges;
for each of the two or more of the multiple fish, receiving a distribution indicating the likelihoods of the biomass of the fish being with the multiple biomass ranges;
aggregating the distributions of the two or more of the multiple fish; and
performing an action based on the aggregated distributions of the two or more of the multiple fish.

9. The medium of claim 8, wherein performing the action comprises transmitting a control message to an actuator, blower, or conveyer of a feed system.

10. The medium of claim 8, wherein the set of features comprises data indicating lengths between key points of each fish.

11. The medium of claim 8, wherein aggregating the distributions comprises summing the likelihoods for each of the multiple biomass ranges.

12. The medium of claim 8, wherein performing the action comprises identifying subpopulations of fish within the aggregated distributions.

13. The medium of claim 8, wherein performing the action comprises changing a location of an ongoing fish feeding session.

14. The medium of claim 8, wherein generating the set of features comprise performing a 3D pose estimation for each of the multiple fish.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining images of multiple fish that were generated by an underwater camera;
for each of two or more of the multiple fish, generating a set of features corresponding to the fish using the obtained images;
for each of the two or more of the multiple fish, providing the set of features corresponding to the fish to a model that is trained, based on a given input set of features for a given fish, to output a distribution indicating likelihoods of a biomass of the given fish being within multiple biomass ranges;
for each of the two or more of the multiple fish, receiving a distribution indicating the likelihoods of the biomass of the fish being with the multiple biomass ranges;
aggregating the distributions of the two or more of the multiple fish; and
performing an action based on the aggregated distributions of the two or more of the multiple fish.

16. The system of claim 15, wherein performing the action comprises transmitting a control message to an actuator, blower, or conveyer of a feed system.

17. The system of claim 15, wherein the set of features comprises data indicating lengths between key points of each fish.

18. The system of claim 15, wherein aggregating the distributions comprises summing the likelihoods for each of the multiple biomass ranges.

19. The system of claim 15, wherein performing the action comprises identifying subpopulations of fish within the aggregated distributions.

20. The system of claim 15, wherein performing the action comprises changing a location of an ongoing fish feeding session.

* * * * *

UNITED STATES PATENT AND TRADEMARK OFFICE
CERTIFICATE OF CORRECTION

| | | |
|---|---|---|
| PATENT NO. | : 12,229,937 B2 | Page 1 of 1 |
| APPLICATION NO. | : 18/490383 | |
| DATED | : February 18, 2025 | |
| INVENTOR(S) | : Julia Black Ling and Laura Valentine Chrobak | |

It is certified that error appears in the above-identified patent and that said Letters Patent is hereby corrected as shown below:

On the Title Page

Column 1, (73) Assignee:
Delete "TidaIX" and insert -- TidalX --.

Signed and Sealed this
Seventh Day of October, 2025

John A. Squires
*Director of the United States Patent and Trademark Office*